United States Patent
Pearson et al.

(10) Patent No.: US 9,948,452 B1
(45) Date of Patent: Apr. 17, 2018

(54) ADAPTER THAT CONVERTS ENHANCED LONG RANGE NAVIGATION (ELORAN) TO PRECISION TIME PROTOCOL (PTP)

(71) Applicant: Sprint Communications Company L.P., Overland Park, KS (US)

(72) Inventors: Timothy Hugh Pearson, Overland Park, KS (US); James W. Norris, Kansas City, MO (US); Steven Kenneth Guthrie, Kansas City, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 175 days.

(21) Appl. No.: 14/061,335

(22) Filed: Oct. 23, 2013

(51) Int. Cl.
*H04L 7/04* (2006.01)

(52) U.S. Cl.
CPC ..................... *H04L 7/04* (2013.01)

(58) Field of Classification Search
None
See application file for complete search history.

(56) References Cited

U.S. PATENT DOCUMENTS

| | | | |
|---|---|---|---|
| 2008/0186232 A1* | 8/2008 | Johannessen | G01S 1/245 342/388 |
| 2009/0168808 A1* | 7/2009 | Cho | G04G 7/00 370/503 |
| 2011/0170465 A1* | 7/2011 | Tavildar | H04W 56/0015 370/311 |

OTHER PUBLICATIONS

Jacoby, James et al., "Advantages of a Combined GPS/Loran-C Precision Timing Receiver", Locus, Inc., presented at NAV 99/ILA 28, London, Nov. 1-3, 1999, 11 pages.
Currey, Charles, "Delivering a National Timescale Using eLORAN", Issue 1.0, Jun. 7, 2014, Chronos Technology Limited, Upper Stowfield, Lydbrook, England, 22 pages.
Helwig, A. et al., "eLoran System Definition and Signal Specification Tutorial", International Loran Association, Nov. 2011, 46 pages.

* cited by examiner

*Primary Examiner* — Wednel Cadeau

(57) ABSTRACT

A method and system are provided for converting an enhanced Long Range Navigational (eLORAN) signal to a Precision Time Protocol (PTP) signal. Network devices can be located within buildings and not have access to a GPS signal directly from a GPS satellite. Network devices may also be located in a line of sight of a GPS satellite but may lose the GPS signal. An adapter is provided that takes an eLORAN signal, when a GPS signal is lost or not available, and converts the signal into a PTP and other signals to act as timing, synchronization, and syntonization inputs into the network devices. In some cases, the network devices can have a PTP client to receive the PTP signal, one pulse per second signal, and a ten (10) megahertz frequency signal. In other cases, the network devices do not have a PTP client, but can receive a time of day message, one pulse per second signal, and the 10 megahertz frequency signal.

10 Claims, 6 Drawing Sheets

ADAPTER THAT CONVERTS ENHANCED LONG RANGE NAVIGATION (ELORAN) TO PRECISION TIME PROTOCOL (PTP)

CROSS-REFERENCE TO RELATED APPLICATIONS

Not applicable.

BACKGROUND OF THE INVENTION

Global Positioning System (GPS) has been determined to have problems from time-to-time. In particular, a GPS signal from a satellite can be lost for a variety of reasons. The GPS signal can be lost from jamming and other interferences. More particular, the GPS signal can be lost due to satellite clock failures, poor signal quality, poor installation practices, design flaws, intentional interferences, unintentional interferences, Ionosphere effects, equipment malfunction, signal occultation, and local interference. Since a multitude of devices, users, and networks depend on GPS for timing and location data, a loss of a GPS signal can negatively impact communications.

In an alternate context, when network devices are deployed in a building, using the GPS signal as a synchronization source may be costly or impossible if distribution of the GPS signal is needed. This problem becomes acute as GPS does not penetrate buildings very well. Unlike the problem discussed above in which the GPS signal is lost, the problem here is that the network device cannot receive the GPS signal. For example, network devices, such as enhanced Node Bs (eNodeB), base stations, picocells, or femtocells, can be deployed within a building or residential area, making it difficult for the GPS signal to reach such devices. As a result, a solution is needed that would allow an alternative or backup signal to be provided when network devices are deployed beyond the clear line of sight of a GPS signal, such as in a building. A solution is also needed when the network devices lose the GPS signal even when deployed in clear line of sight of the GPS signal.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method and system for relaying a timing signal from enhanced Long Range Navigation (eLORAN) to Precision Time Protocol (PTP). eLORAN uses a low frequency radio frequency (RF) signal that includes clock synchronization through the LORAN data channel. This clock synchronization can be taken from the Loran data channel and converted to a Precision Time Protocol (PTP). The PTP is then delivered over Ethernet to a destination device. The PTP signal can be sent as input to network devices that have a PTP client. In other embodiments, components of the eLORAN signal and the PTP signal, such as a time of day message (ToD), one pulse per second signal, and a ten (10) megahertz frequency signal, can be used as input to network devices that do not have the PTP client.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
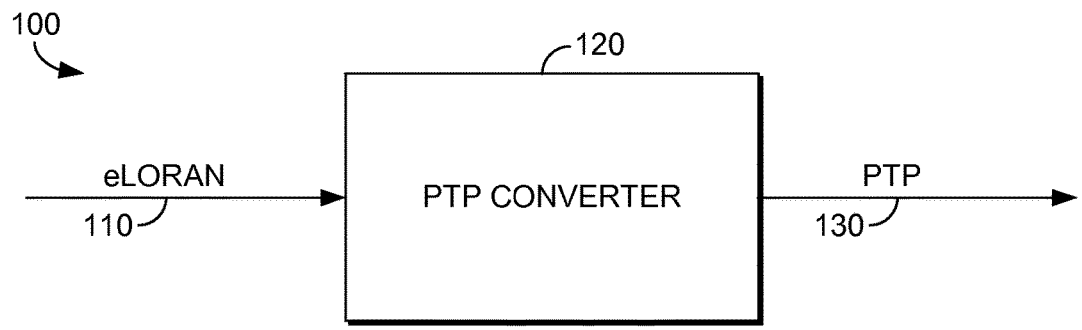
FIG. 1 is an exemplary illustration of a Precision Time Protocol (PTP) converter implemented in accordance with an embodiment of the present invention.

Embodiments of the present invention relate generally to a method and system for converting an enhanced Long Range Navigation (eLORAN) signal to a Precision Time Protocol (PTP) signal when the GPS signal is unavailable or lost from a GPS satellite. An adapter receives an eLORAN signal, which is a RF signal, extracts certain data from the Loran data channel, performs a conversion, and outputs a PTP signal over an Ethernet cable.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| eLORAN | Enhance Long Range Navigation |
| eNodeB | Enhanced Node B |
| GPS | Global Positioning System |
| IEEE | Institute of Electrical and Electronics Engineers |
| IPv4 | Internet Protocol version 4 |
| IPv6 | Internet Protocol version 6 |
| MHz | Megahertz |
| PPS | Pulse per second |
| PTP | Precision Time Protocol |
| RF | Radio Frequency |
| UDP | User Datagram Protocol |

Further, various technical terms are used throughout this description. A definition of such terms can be found in

*Newton's Telecom Dictionary* by H. Newton, 27th Edition (2013). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, apparatus, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

eLORAN to PTP Converter Device

Embodiments of the present invention disclose a method and system for receiving inputs at a terminal adapter and allowing the terminal adapter to subsequently deliver a PTP signal for timing synchronization or other information to a network device. This terminal adapter receives an eLORAN signal and converts the signal to PTP. The eLORAN and PTP signals can provide information that is used for synchronizing network devices.

In a first aspect, a method for relaying a timing signal is provided that includes receiving an enhanced Long Range Navigation (eLORAN) signal at an adapter. The eLORAN signal is converted to a Precision Time Protocol (PTP) signal. The PTP signal is sent to a network device. The network device has a processor coupled to a memory.

In a second aspect, a method for relaying a timing signal is provided that includes receiving an enhanced Long Range Navigation (eLORAN) signal at an adapter. Information is extracted from an eLORAN data channel in the eLORAN signal. This extraction includes extracting a time of day message. The eLORAN signal is converted to a Precision Time Protocol (PTP) signal. A one pulse per second signal and a ten (10) megahertz frequency signal are derived from the PTP signal. The time of day message, one pulse per second signal, and 10 megahertz frequency signal are sent to a network device. The network device has a processor coupled to a memory.

In FIG. 1, a conversion system 100 is shown with an enhanced Long Range Navigation (eLORAN) input 110 entering into a converter 120. Input 110 is a radio frequency (RF) signal that is received into converter 120. As one of ordinary skill in the art knows, eLORAN is an internationally standardized positioning, navigation, and timing service for use by many modes of transport and other applications. eLORAN is a low-frequency system. eLORAN meets the accuracy, availability, integrity and continuity performance requirements for aviation non-precision instrument approaches, maritime harbor entrance and approach maneuvers, land-mobile vehicle navigation and location-based services, and is a precise source of time and frequency for applications such as telecommunications. Although the details of eLORAN will not be discussed here, it is noted that eLORAN has a data channel that is transmitted. This data channel is referred to as the Loran data channel.

When input 110 is received at converter 120, a conversion occurs that converts the eLORAN signal to a Precision Time Protocol (PTP) signal. The PTP signal is shown as PTP 130. PTP is implemented in accordance to the IEEE 1588 protocol or another clock synchronization protocol. PTP can be transported over various physical layers. In the embodiment here, PTP is transported over Ethernet, also known as PTP over IEEE 802.3 or PTP over Ethernet. PTP can also be found in implementations such as PTP over UDP over IPv4 and PTP over UDP over IPv6.

Figure 2:
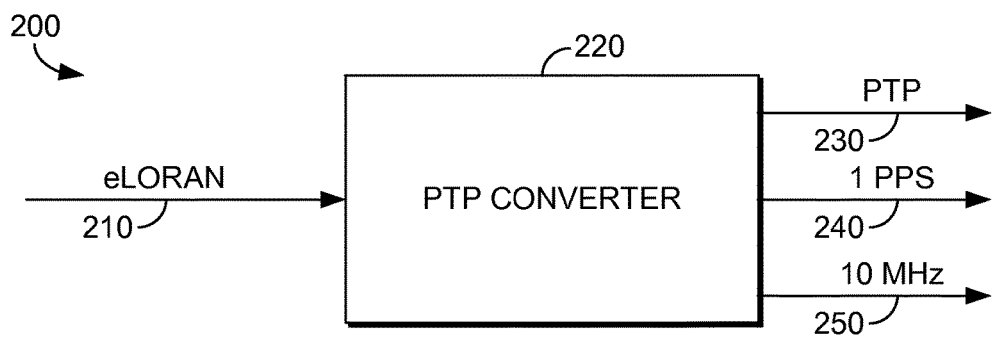
FIG. 2 is another exemplary Precision Time Protocol (PTP) converter implemented in accordance with an embodiment of the present invention.

Turning now to FIG. 2, a conversion system 200 is shown, which is similar to conversion system 100. eLORAN input 210 is received at PTP converter 220. The conversion from eLORAN to PTP occurs within PTP converter 220. From the conversion process, several outputs of signals are provided. PTP 230 is provided as an output and can act as an input into a network device. A one pulse per second signal, shown as a signal 240, can be provided as an output to the network device. Also, a ten (10) megahertz frequency signal, shown as a signal 250, can be provided as an output to the same or different network device. The idea here is to show that an embodiment of the present invention implements converter 220 to receive an eLORAN input signal, perform a conversion, and provide multiple outputs such as PTP 230, 1 PPS signal 240, and 10 MHz signal 250.

Figure 3:
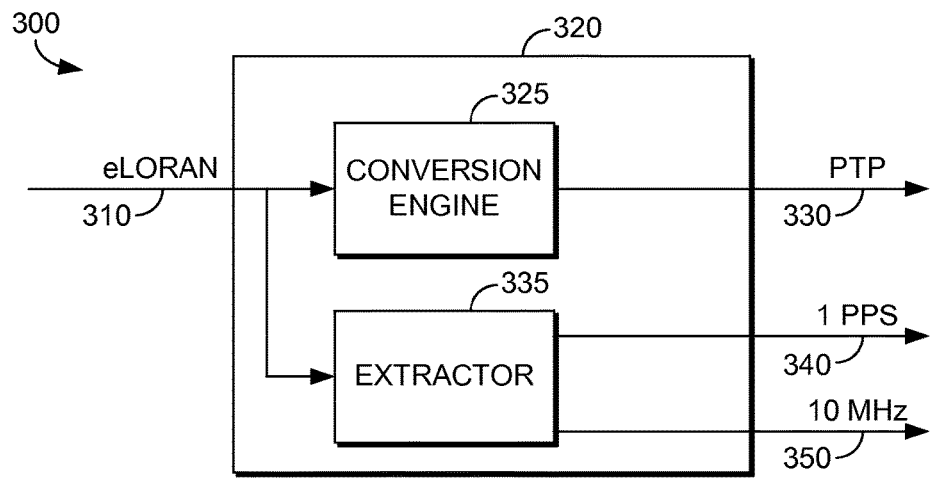
FIG. 3 is an exemplary illustration of a timing signal converter implemented in accordance with an embodiment of the present invention.
Figure 4:
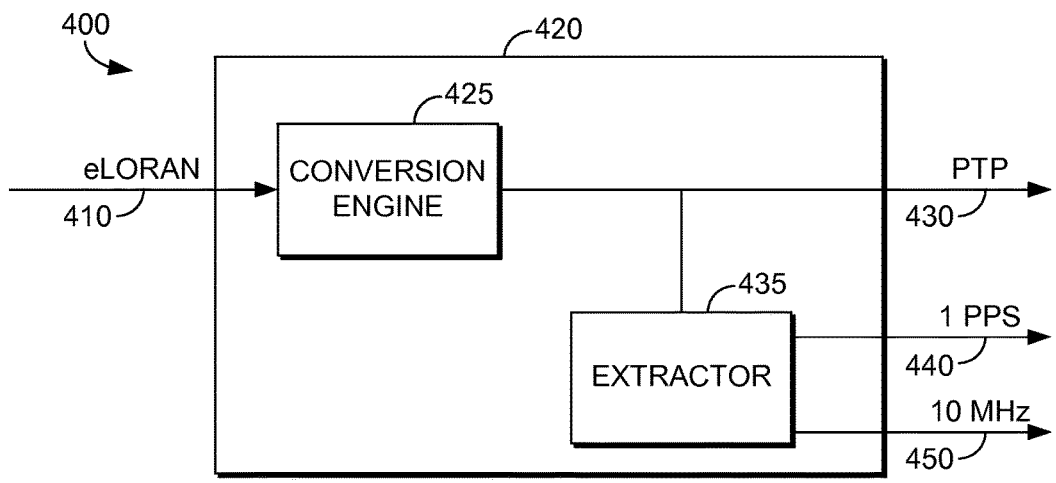
FIG. 4 is another exemplary illustration of a timing signal converter implemented in accordance with an embodiment of the present invention.

In FIGS. 3 and 4, conversion systems 300 and 400 are expanded views of conversion system 200. Conversion systems 300 and 400 implement different embodiments of conversion system 200. In FIG. 3, a converter 320 receives an eLORAN signal 310. eLORAN signal 310 is received by a conversion engine 325 and an extractor 335. Conversion engine 325 converts the eLORAN signal into a PTP signal, shown as PTP 330. In particular, conversion engine 325 performs the conversion by taking information from the Loran data channel. Likewise, extractor 335 takes the same eLORAN signal 310 and extracts data to output a one pulse per second signal and a ten (10) megahertz frequency signal, respectively shown as a signal 340 and a signal 350.

In FIG. 4, an eLORAN signal 410, which is the same as eLORAN signal 310, is received into a converter 420. A conversion engine 425 receives the eLORAN signal 410 and performs the conversion. From the conversion, a PTP signal is created and sent as an output shown as PTP 430. In addition, the same PTP signal is diverted into an extractor 435, where information is extracted and filtered in order to provide a one pulse per second signal and a ten (10) megahertz frequency signal, respectively shown as a signal 440 and a signal 450.

As one can see, the same outputs are provided in FIGS. 3 and 4. However, each embodiment is implemented differently. In FIG. 3, signals 340 and 350 are created in extractor 335 based on an input from an eLORAN signal. In FIG. 4, signals 440 and 450 are created in extractor 435 based on an input from a PTP signal. The end results are the same but the implementations are different.

Figure 5:
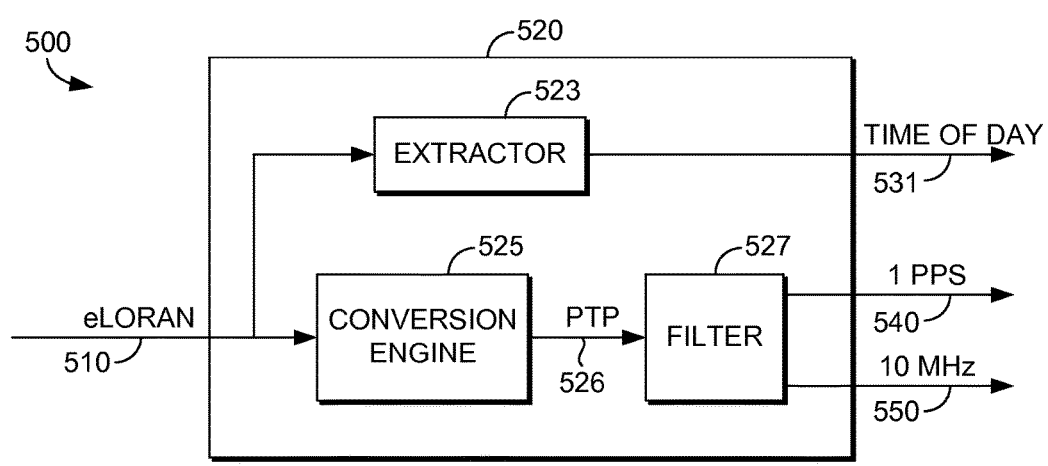
FIG. 5 is yet another exemplary illustration of a timing signal converter implemented in accordance with an embodiment of the present invention.

Turning now to FIG. 5, a conversion system 500 is shown with a converter 520 receiving an eLORAN signal 510. As one of ordinary skills understands, a Loran data channel is contained within eLORAN signal 510. The Loran data channel carries differential eLORAN correction, Universal Time Coordinated (UTC) time of day and date information, eLORAN integrity information, differential global positioning system (GPS) information, GPS integrity information, and other data. The availability of the different information enables converter 520 to convert eLORAN signal 510 into a variety of output signals.

eLORAN signal 510 is received at an extractor 523 and a conversion engine 525. Extractor 523 extracts a time of day signal 531 from the Loran data channel and outputs the time of day signal 531, also known as a time of day message. Also, within converter 520, conversion engine 525 takes the eLORAN signal and converts it to a PTP signal shown as PTP 526. PTP 526 is provided as input into a filter 527. From filter 527, a one pulse per second signal 540 and a ten (10) megahertz frequency signal 550 are provided as outputs.

In FIGS. 1-5, a variety of outputs are provided based on the conversion process that occurs within the converters. The variety of outputs is provided to network devices to provide timing and synchronization to the network devices. In some embodiments, the network devices have PTP clients that enable them to receive the PTP input. In other embodiments, the network devices do not have PTP clients. However, the network devices can receive timing and synchronization information such as time of day messages, one pulse per second signals, and ten (10) megahertz frequency signals.

Further, in FIGS. 1-5, the various conversion systems include various converters that are also called adapters. In some embodiments, the converters can be implemented with a processor coupled to a memory. In other embodiments, the converters are standalone hardware devices.

Figure 6:
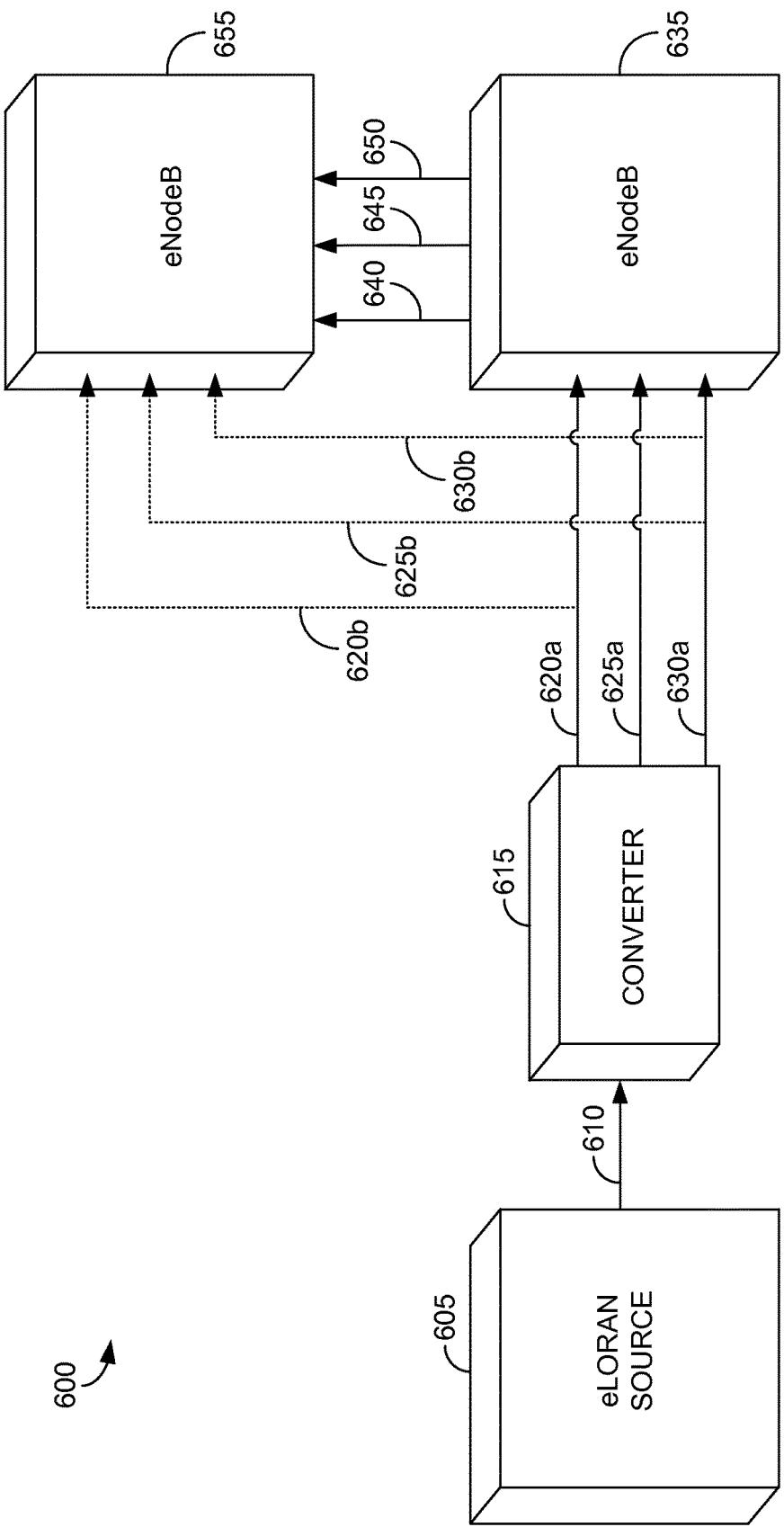
FIG. 6 is an exemplary illustration of a system that provides eLORAN-to-PTP conversion in accordance with an embodiment of the present invention.

In FIG. 6, an exemplary implementation of a network that includes a conversion process from eLORAN to PTP is shown in a network 600. eLORAN source 605 represents eLORAN stations that transmit an eLORAN signal, which is an RF signal. Although not shown in the figure, eLORAN source 605 can include one or more antennas to radiate the eLORAN signal in an omnidirectional pattern. As shown in FIG. 6, eLORAN signal 610 is received by a converter 615. Converter 615 is representative of the converters and adapters discussed earlier in FIGS. 1-5. Converter 615 converts eLORAN signal 610 into a PTP signal and other signals. Those other signals can include a one pulse per second signal and a ten (10) megahertz frequency signal. The one pulse per second signal can be used for timekeeping and time measurement. In some embodiments, the one pulse per second is called an on-time pulse. The 10 megahertz frequency signal is a standard or reference frequency. It is an exemplary frequency that is implemented in embodiment of the present invention. However, another frequency can be used as the standard or reference frequency, such as a five (5) megahertz frequency signal.

Continuing with FIG. 6, from converter 615, outputs are provided for a PTP signal on PTP 620a, a one pulse per second signal on PPS 625a, and a 10 megahertz frequency signal on signal 630a. As discussed earlier, eNodeBs 635 and 655 may be located in a building or location where a GPS signal cannot be used. eNodeBs 635 and 655 may be located in sight of a GPS signal, but may be unable to receive the GPS signal. In such case, PTP 620a, PPS 625a, and signal 630a provide the timing and synchronization to eNodeB 635. From eNodeB 635, other network devices may receive timing and synchronization information. These network devices may or may not have PTP clients. Likewise, converter 615 may direct output to both eNodeB 635 and eNodeB 655. In such case, eNodeB 655 would receive a PTP 620b, a PPS 625b, and signal 630b.

It is noted that eNodeBs 635 and 655 are exemplary network devices that can receive and transmit timing, synchronization, and syntonization information. Usually, synchronization is used to identify things set to the same time. Syntonization is used to identify things tuned to the same frequency. Throughout this specification, the use of syntonization is not used much. It is noted that the use of the terms timing and synchronization only will also imply the use of syntonization.

Throughout this specification, eNodeBs 635 and 655 were used as exemplary network devices. However, other network devices can be implemented to receive and transmit timing and synchronization information.

When eNodeB 635 receives PTP 620a, PPS 625a, and signal 630a, eNodeB 635 can transmits the same signals as a PTP 640, a PPS 645, and a signal 650 to eNodeB 655 to enable eNodeB 655 to receive timing and synchronization information.

Although FIG. 6 illustrated an exemplary embodiment of a conversion from eLORAN to PTP with outputs of a PTP signal, one pulse per second signal, and a 10 megahertz frequency signal, another exemplary embodiment could be implemented using the embodiments of FIG. 5 to provide outputs that would include a time of day signal, one pulse per second signal, and a 10 megahertz frequency signal. In yet another embodiment, the 10 megahertz frequency signal could be replaced by a 5 megahertz frequency signal. The idea here is to convey that some network devices might include a PTP client that can receive a PTP signal while others might not have the PTP client but can still receive timing and synchronization information.

Figure 7:
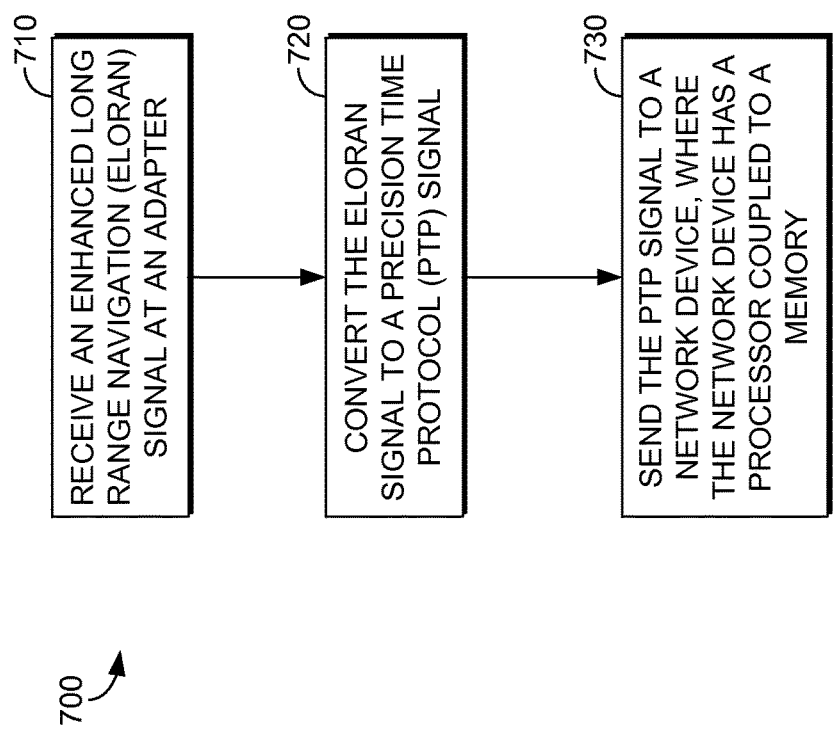
FIG. 7 is a process for relaying a timing signal, implemented in accordance with an embodiment of the present invention.

In FIG. 7, a process for relaying a timing signal is provided in a method 700. In a step 710, eLORAN signal 110 is received at adapter 120. eLORAN signal 720 is converted to PTP signal 130, in a step 720. In a step 730, PTP signal 130 is sent to a network device, such as eNodeB 635, where the network device has processor coupled to a memory.

Figure 8:
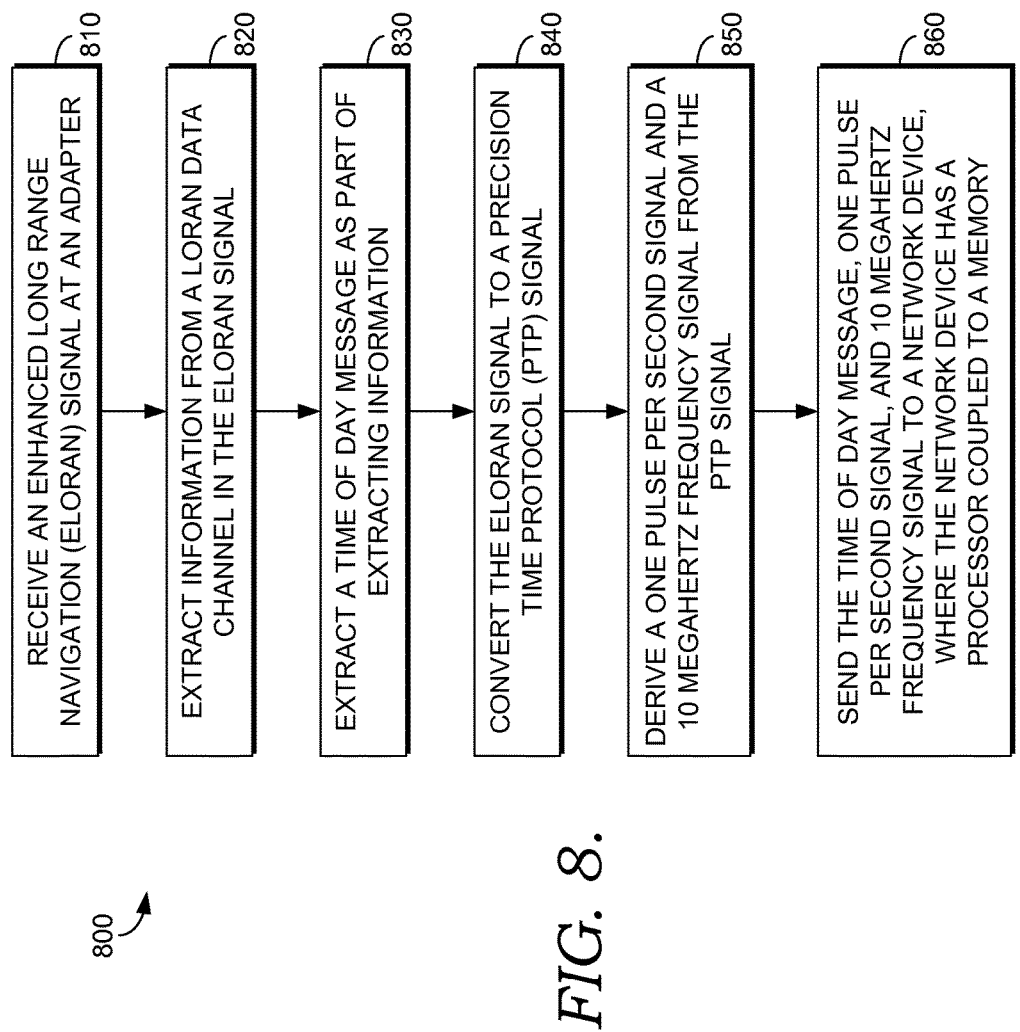
FIG. 8 is another process for relaying a timing signal, implemented in accordance with an embodiment of the present invention.

Turning now to FIG. 8, another process for relaying a timing signal is provided in a method 800. In a step 810, eLORAN signal 510 is received at adapter 520. Extractor 523 extracts information from a Loran data channel in eLORAN signal 510, in a step 820. In a step 830, time of day message 531 is extracted as part of extracting information. While eLORAN signal 510 is sent to extractor 523, eLORAN signal 510 is also sent to conversion engine 525. eLORAN signal 510 is converted to a PTP signal 526 in conversion engine 525, in a step 840. In a step 850, a one pulse per second signal (PPS 540) and a 10 megahertz frequency signal (signal 550) are derived from PTP signal 526 in filter 527. In a step 860, time of day message 531, PPS 540, and signal 550 are sent to a network device, such as eNodeB 635 or 655.

As one of ordinary skill in the art knows, an implementation of the embodiment of the present invention allows network devices to be deployed where either the GPS signal is unavailable or the GPS signal is lost. Clock synchronizations can still be provided from an eLORAN source or station where the eLORAN signal is an RF signal. The eLORAN signal is provided to a converter device. The converter device will enable numerous network devices to be deployed without concern for a clear line of sight of a GPS signal from a GPS satellite.

Many different arrangements of the various components depicted, as well as components not shown, are possible without departing from the spirit and scope of embodiments of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

Certain features and subcombinations are of utility and may be employed without reference to other features and subcombinations and are contemplated to be within the scope of the claims. Not all steps listed in the various figures need be carried out in the specific order described.

The invention claimed is:

1. A method for relaying a timing signal, comprising:
   receiving an enhanced Long Range Navigation (eLORAN) signal at an adapter, wherein a global positioning system (GPS) signal is unavailable, wherein the adapter is a conversion device that has a conversion engine and a separate extractor;
   converting the eLORAN signal to three separate signals that are a Precision Time Protocol (PTP) signal, a one pulse per second signal, and a 10 megahertz frequency signal, wherein converting the eLORAN signal comprises extracting information from an eLORAN data channel in the eLORAN signal, wherein extracting information from the eLORAN data channel comprises extracting a timing message, a differential phase correction message, an eLORAN integrity information, a differential global positioning system (GPS) information, and a GPS integrity information; and
   sending the PTP signal, one pulse per second signal, and 10 megahertz signal to a network device, the network device having a processor coupled to a memory.

2. The method of claim 1, further comprising extracting from the eLORAN data channel at the extractor the one pulse per second signal and the 10 megahertz frequency signal.

3. The method of claim 1, further comprising deriving the one pulse per second signal and the 10 megahertz frequency signal from the PTP signal, wherein the PTP signal comes from the conversion engine in the adapter.

4. The method of claim 1, wherein the network device comprises a PTP client.

5. A method for relaying a timing signal, comprising:
   receiving an enhanced Long Range Navigation (eLORAN) signal at an adapter, wherein a global positioning system (GPS) signal is unavailable, wherein the adapter is a conversion device that has a conversion engine and a separate extractor;
   with the extractor, extracting information from an eLORAN data channel in the eLORAN signal, wherein extracting information comprises extracting a time of day message, a differential phase correction message, an eLORAN integrity information, a differential global positioning system (GPS) information, and a GPS integrity information;
   with the conversion engine, converting the eLORAN signal to a Precision Time Protocol (PTP) signal;
   sending the PTP signal to a filter in the adapter;
   deriving a one pulse per second signal and a 10 megahertz frequency signal in the filter from the PTP signal; and
   sending the time of day message, one pulse per second signal, and 10 megahertz frequency signal to a network device, the network device having a processor coupled to a memory.

6. The method of claim 5, wherein the adapter has a processor coupled to a memory.

7. The method of claim 5, wherein the eLORAN signal is a radio frequency (RF) signal.

8. A system for relaying a timing signal, comprising:
   an adapter having a conversion engine and a separate extractor that:
      receives an enhanced Long Range Navigation (eLORAN) signal,
      wherein a global positioning system (GPS) signal is unavailable or the GPS signal is lost;
      converts the eLORAN signal to a Precision Time Protocol (PTP) signal, a one pulse per second signal, and a 10 megahertz frequency signal; and
      sends the PTP signal, one pulse per second signal, and 10 megahertz frequency signal to a network device, wherein the network device has a processor coupled to a memory,
   wherein the adapter is a device called a terminal adapter,
   wherein the adapter that receives the eLORAN signal comprises the adapter that receives a set of information over an eLORAN data channel, and
   wherein the adapter that receives the set of information over the eLORAN data channel comprises the adapter that receives a timing message, a differential phase correction message, an eLORAN integrity information, a differential global positioning system (GPS) information, and a GPS integrity information.

9. The system of claim 8, further comprising the adapter that derives the one pulse per second signal and the 10 megahertz frequency signal from the PTP signal.

10. The system of claim 8, wherein the network device comprises a PTP client.

* * * * *